United States Patent [19]
Crabb

[11] 3,882,952
[45] May 13, 1975

[54] STEERING SYSTEM WITH SECONDARY STEERING MEANS
[75] Inventor: Elmer R. Crabb, Pekin, Ill.
[73] Assignee: Caterpillar Tractor Company, Peoria, Ill.
[22] Filed: Oct. 26, 1973
[21] Appl. No.: 409,866

[52] U.S. Cl. ............................... 180/79.2 R; 60/404
[51] Int. Cl. ................................................. B62d 5/08
[58] Field of Search .................. 180/79.2 R, 79.2 B; 60/404, 403, 405

[56] References Cited
UNITED STATES PATENTS

| | | | |
|---|---|---|---|
| 2,875,843 | 3/1959 | Price | 180/79.2 R |
| 3,123,174 | 3/1964 | Bednar et al. | 180/79.2 B |
| 3,458,998 | 8/1969 | Bishop | 60/404 X |
| 3,579,984 | 5/1971 | Rhode | 60/404 X |

*Primary Examiner*—David Schonberg
*Attorney, Agent, or Firm*—Phillips, Moore, Weissenberger, Lempio & Strabala

[57] ABSTRACT

A secondary steering system is provided to back-up a conventional hydraulic steering system in emergency situations. The secondary system includes a fluid accumulator for storing system fluid under pressure and a valve for regulating flow of such fluid in response to system pressure. Above a predetermined pressure level, fluid is diverted from the main system to the accumulator until a fully charged condition exists therein. Below this pressure level, fluid is released from the accumulator to the main system by selective actuation of the valve and by operation of the conventional steering controls.

10 Claims, 2 Drawing Figures

STEERING SYSTEM WITH SECONDARY STEERING MEANS

BACKGROUND OF THE INVENTION

The invention relates generally to secondary steering means for use in conjunction with a conventional hydraulic steering system. In particular, it relates to an auxiliary steering system which has valve means responsive to fluid pressure within the main steering system for regulating fluid flow to the auxiliary system for charging and to the main system to provide sufficient pressure for vehicle steerage in the event of a failure in the main system.

Many large earthmoving vehicles employ a hydraulic fluid steering system which includes a pair of hydraulic jacks as the exclusive means for steering the vehicle. One disadvantage of such systems is that, in the event of failure in the engine or fluid pump means, there is no mechanical back-up system for steering the vehicle.

An example of prior art attempts to provide such a back-up system is provided in U.S. Pat. No. 3,603,424 to Blood, of common assignment herewith, which teaches an auxiliary emergency steering system associated with the braking system of the vehicle. Such prior art systems are typically unsatisfactory, at least to some extent, in achieving the desired steering function, and are often complex and expensive to fabricate. Other brake and steering systems including control valve means are exemplified by U.S. Pat. Nos. 3,142,962; 3,278,239; 3,269,481; 3,363,711 to Lohbauer, Klaus et al., Peterson, and Knell et al. respectively, all of commmon assignment herewith.

SUMMARY AND OBJECTS OF THE INVENTION

Accordingly, the invention provides a relatively simple secondary steering means useable as a back-up system for a main hydraulic steering system in the event of a failure in the main system. The secondary or auxiliary means includes fluid accumulator means for storing fluid from a high pressure supply source and valve means for regulating fluid flow between the auxiliary and main steering systems in response to fluid pressure levels in the main system.

The control valve means respond to the attainment of fluid pressures above a predetermined level in the main system to charge the accumulator means and to system pressures below said predetermined level to restrict flow from the accumulator means the main system. The control valve means are automatically selectively actuable by manual operation of the steering controls when fluid pressure in the main system is below a said predetermined level to release fluid from the storage means to the main system.

It is an object of this invention to provide a relatively simple auxiliary steering means for backing-up a main steering system in the event of a failure of same.

It is another object of this invention to provide a secondary steering means having control valve means automatically responsive to low fluid pressure in the main hydraulic system to communicate fluid flow from the auxiliary system to the main system and thereby restore steering function.

It is a further object of this invention to provide a secondary steering means having control valve means automatically selectively actuable by manual operation of the steering controls to direct fluid flow from the auxiliary system to the main system when fluid pressure within the main system is below a predetermined level.

Other objects and advantages of the invention will become apparent from the following description and drawing.

DETAILED DESCRIPTION

Figures 1, 2:
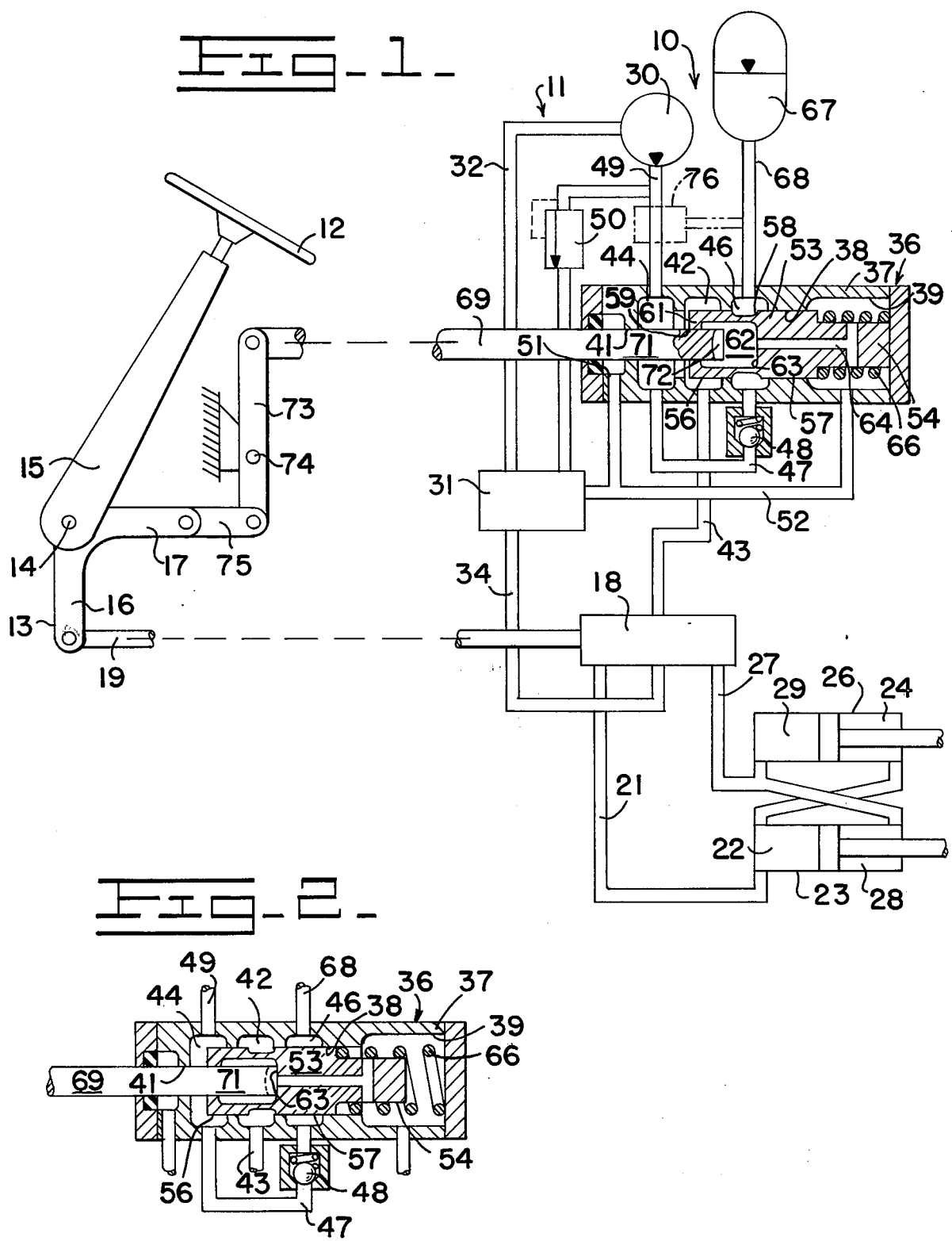
FIG. 1 is a schematic view of a main hydraulic steering system equipped with the auxiliary steering means of the present invention.
FIG. 2 is a sectional elevation of the control valve means shown in FIG. 1.

With reference to the drawing, an auxiliary steering means is generally indicated at 10 in operative association with a main hydraulic steering system 11 of a vehicle (not shown). The main system includes operating means including a steering wheel 12 adapted to pivot a bell crank 13 about a point 14 through conventional linkage means enclosed within a post housing 15. The bell crank has a pair of arms 16 and 17 with the arm 16 connected to a main steering control valve means 18 by way of linkage 19 for controlling fluid flow in the main system 11.

A conduit 21 communicates the main control valve to the head end 22 of a steering jack 23 and to the rod end 24 of a second steering jack 26 while a conduit 27 communicates the steering control valve to the rod end 28 of steering jack 23 and to the head end 29 of steering jack 26. As will be explained hereinafter, the steering control valve 18 receives pressurized hydraulic fluid from a pump means 30 for pumping fluid from a reservoir 31 through a conduit 32. Fluid exhausted from the valve means 18 is communicated back to the reservoir through a conduit 34.

The auxiliary steering means 10 includes an open center control valve 36 having a body 37 provided with a stepped bore 38 with an enlarged chamber portion 39 disposed at one end and a reduced diameter chamber portion 41 disposed at the opposite end. The valve body is provided with a central annular recess 42 which is connected to the steering control valve 18 through fluid communication means 43. A pair of annular recesses 44 and 46 are individually disposed on opposite sides of the annular recess 42 and are interconnected through conduit 47 and check valve means 48 therein. The annular recess 44 is connected to the pump means 30 through a conduit 49. Relief valve means 50 communicate between conduit 49 and reservoir 31 for relieving excessive pressure therein. An annular recess 51 is disposed within the valve body in axially spaced relation to the annular recess 44. The annular recess 51 and enlarged chamber portion 39 communicate with the reservoir 31 through a branched drain conduit 52.

An elongated valve spool 53 is slidably disposed within the bore 38 and has a reduced diameter portion 54 formed on one end thereof which extends into the enlarged chamber portion 39. The opposite end of the spool has a pair of axially spaced lands 56 and 57 formed thereon which are separated by a reduced diameter portion 58. An axial passage 59 extends through an end wall 61 of the spool and communicates with a cavity 62 which terminates at an annular face 63. A vent passage 64 is axially disposed in the spool and communicates the cavity 62 with the enlarged chamber portion 39. A spring 66 is circumferentially disposed about the reduced diameter portion 54 of the valve spool 53 for biasing the spool leftwardly as shown in the drawing. Accumulator means 67, for storing fluid under pressure, communicates with the annular recess 46 of the valve body 37 by means of conduit 68.

The auxiliary steering system 10 further includes connecting means, such as a control stem 69, having an end 71 slidably received within the cavity 62 and extending through the passage 59 of the valve spool 53. A slot 72 is transversely formed in the end of the stem. The opposite end of the stem 69 is pivotally connected to linkage means for linking it to the steering operating means. Such linkage means comprises a lever 73 which is pivotally secured to the vehicle at a pivot point 74, a connecting link 75 pivotally connected to the lever 73 at one end thereof and to an arm 17 of the bell crank 13, at the opposite end thereof.

An alternate circuit component is shown in phantom. It includes a charging valve means 76 which communicates between the conduits 49 and 68 for charging the accumulator 67. The accumulator charging valve is of the type disclosed in aforementioned U.S. Pat. No. 3,142,962 to Lohbauer.

OPERATION

During normal vehicular operations, pressurized fluid from the pump means 30 is directed into the annular recess 44 where it acts upon end wall 61 of the valve spool 53 causing it to shift rightwardly against the bias of the spring 66 to a first valve position, as shown in FIG. 1. With the valve spool in such first position, annular recess 44 is in communication with annular recess 42 permitting the fluid to flow through conduit 43 to the steering control valve means 18. Rotation of the steering wheel 12 in a first direction causes clockwise rotation of the bell crank which, in turn, actuates the steering control valve means 18 to direct fluid through the conduit 21 to the steering jacks 23 and 24 to effect turning of the vehicle in one direction. Rotation of the steering wheel in the opposite direction causes counterclockwise rotation of the bell crank 13 shifting the steering control valve means 18 to direct fluid through the conduit 27 to the steering jacks 23 and 24 to effect turning of the vehicle in the opposite direction. During the initial steering movements, a portion of the fluid from the pump means 30 is also directed through the annular recess 44, conduit 47, check valve means 48, annular recess 46, and conduit 68 to charge the accumulator 67. The check valve means 48 prevents reverse flow of fluid from the accumulator 67 to the pump means 30.

The alternate charging valve means 76 is adapted to divert a portion of the fluid flow from the pump to charge the accumulator 67 immediately upon start-up of the vehicle engine (not shown) while maintaining partial flow to the steering control valve means 18 for steering maneuvers. After the accumulator 67 is charged, full pump flow is made available to the steering control valve means 18. The alternate charging valve means 76 eliminates a potentially hazardous situation wherein demand for hydraulic fluid to the steering jacks 23 and 24 during the initial steering maneuvers may be greater than that required to fill the accumulator 67, resulting in a momentary delay of fluid flow to the steering jacks.

The lever 73 and link 75 combination is connected to the arm 17 of the bell crank 13 and is effective to move the control stem 69 rightwardly when the steering wheel is rotated in either direction.

With the valve spool 53 in the first valve position, however, the end 71 of the control stem will be spaced from the annular face 63 regardless of whether the stem 69 is disposed rightwardly or leftwardly and will have no effect on normal steering functions. With the valve spool disposed in its second position, however, the operation is different. Should the pump means 30 become inoperative for example, due to a failure thereof or due to engine stoppage, a pressure drop would occur in conduit 49 and annulus 44 and would allow the spring 66 to shift the valve spool 53 leftwardly to its second position, as shown in FIG. 2. In this orientation, the face 63 of the spool would move leftwardly proximate or contacting the end 71 of the control stem 69. With the valve spool in such position, the land 56 would block communication between the annular recesses 44 and 42 while land 57 would concurrently block communication between annular recesses 42 and 46. The check valve 48 would remain effective to prevent reverse flow of fluid through the conduit 47 and thus fluid in the accumulator 67 would be retained and available for emergency steering maneuvers.

Under such conditions, turning the steering wheel 12 in either direction effects rightward mechanical translation of the valve spool 53 against the bias of spring 66 into an intermediate third valve position wherein the reduced diameter portion 58 communicates annular recess 46 with annular recess 42. This permits the fluid stored in the accumulator 67 to flow via recesses 46 and 42 to the steering control valve 18 which remains mechanically effective for directing the fluid to the steering jacks 23 and 24 in the normal manner. Returning the steering wheel to the neutral position permits the valve spool 53 to return to its second or accumulator blocking position to conserve remaining fluid in the accumulator until the steering wheel is again rotated to steer the vehicle.

While the invention has been described with particular reference to the preferred embodiment, it is apparent that variations and modifications are possible within the purview of the inventive concepts. No limitation with respect to such variations and modifications is intended, except by the scope of the appended claims.

I claim:

1. In a vehicular steering system having; a source of fluid under pressure, steering motor means, primary control valve means, fluid communication means for communicating said pressure source with said primary control valve means, and for communicating said primary control valve means with said steering motor means, steering mechanism means for actuating said primary control valve means to control the flow of pressure fluid to and from said steering motor means, the improvement comprising; secondary steering means for providing a supply of pressure fluid for operating said steering motor means in the event of failure of said source of fluid under pressure to supply said steering motors, said secondary steering means including accumulator means supplied by said source for storing fluid under pressure for selective passage to said steering motor means, secondary control valve means for controlling fluid flow from said source to said accumulator means and from said accumulator means to said steering motor means, said secondary control valve means operative for automatically permitting fluid flow from said source to said accumulator means while concurrently blocking flow from said accumulator means to said steering motor means when the pressure of said source is above a first predetermined value, said secondary control valve means being further operative for communicating flow from said accumulator means to said steering motor means while concurrently blocking flow from said source to said steering motor means when the pressure of said source is below said first predetermined value, said steering mechanism means including mechanical linkage means directly connected to said secondary control valve means and to said primary control valve means for actuating said secondary control valve means concurrently with said primary control valve means to provide immediate mechanical control of fluid flow from said accumulator means to said steering motor means when the pressure of said source drops below said first predetermined value.

2. The invention of claim 1 wherein said steering motor means include a pair of double acting hydraulic fluid jacks.

3. In a vehicular steering system having; a source of fluid under pressure, steering motor means, primary control valve means, fluid communication means for communicating said pressure source with said primary control valve means, and for communicating said primary control valve means with said steering motor means, steering mechanism means for actuating said primary control valve means to control the flow of pressure fluid to and from said steering motor means, the improvement comprising; secondary steering means for providing a supply of pressure fluid for operating said steering motor means in the event of failure of said source of fluid under pressure to supply said steering motors, said secondary steering means including accumulator means supplied by said source for storing fluid under pressure for selective passage to said steering motor means, secondary control valve means for controlling fluid flow from said source to said accumulator means and from said accumulator means to said steering motor means, said secondary control valve means operative for automatically permitting fluid flow from said source to said accumulator means while concurrently blocking flow from said accumulator means to said steering motor means when the pressure of said source is above a first predetermined value, said secondary control valve means being further operative for communicating flow from said accumulator means to said steering motor means while concurrently blocking flow from said source to said steering motor means when the pressure of said source is below said first predetermined value, said steering mechanism means including mechanical linkage means directly connected to said secondary control valve means for actuating said secondary control valve means concurrently with said primary control valve means, said secondary control valve means including; a valve body having bore means including first, second and third annuli, a valve spool disposed within said bore means, first communication means for connecting said source with said first annulus, second communication means, for connecting said first annulus with said third annulus, third communication means for connecting said third annulus with said accumulator means, fourth communication means for connecting said second annulus with said steering motor means.

4. The invention of claim 3 wherein said valve spool includes a plurality of spaced apart lands, said valve spool movable within said bore means to a first position wherein a land thereof blocks fluid communication between said second and third annuli while communication exists between said first and second annuli.

5. The invention of claim 4 wherein said valve spool is further movable within said bore means to a second position wherein a land blocks communication between said first and second annuli and wherein another of said lands blocks communication between said second and third annuli.

6. The invention of claim 5 further including spring means for constantly urging said valve spool away from said first position and toward said second position.

7. The invention of claim 3 wherein said seocnd communication means include one-way check valve means for preventing fluid flow from said third annulus to said first annulus.

8. The invention of claim 3 wherein said mechanical linkage means include a stem member received within said bore means of said secondary control valve body and directly selectively engaging a first portion of said valve spool upon manipulation of said steering mechanism means.

9. The invention of claim 8 wherein said steering mechanism means is manipulatable in a first direction and in a second direction opposite to said first direction, and wherein manipulation of said steering mechanism means in either of said first or second directions will move said valve spool away from said second position and toward said first position when said valve spool is in said second position.

10. The invention of claim 9 wherein said valve spool, when in said first position, will be unaffected by manipulation of said steering mechanism means in either said first or second directions.

* * * * *

UNITED STATES PATENT OFFICE
CERTIFICATE OF CORRECTION

PATENT NO. : 3,882,952
DATED : May 13, 1975
INVENTOR(S) : Elmer R. Crabb

It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this twenty-eight Day of October 1975

[SEAL]

Attest:

RUTH C. MASON
Attesting Officer

C. MARSHALL DANN
Commissioner of Patents and Trademarks